(12) United States Patent
Blate et al.

(10) Patent No.: US 12,398,983 B2
(45) Date of Patent: Aug. 26, 2025

(54) APPLICATIONS OF ULTRA-SHORT PULSE LASER SYSTEMS

(71) Applicants: Alex Blate, Raleigh, NC (US); Douglas Bennett, Chapel Hill, NC (US)

(72) Inventors: Alex Blate, Raleigh, NC (US); Douglas Bennett, Chapel Hill, NC (US)

(73) Assignee: AURA Technologies, LLC, Carrboro, NC (US)

( * ) Notice: Subject to any disclaimer, the term of this patent is extended or adjusted under 35 U.S.C. 154(b) by 457 days.

(21) Appl. No.: 17/802,462

(22) PCT Filed: Mar. 10, 2021

(86) PCT No.: PCT/US2021/021778
§ 371 (c)(1),
(2) Date: Aug. 25, 2022

(87) PCT Pub. No.: WO2021/236207
PCT Pub. Date: Nov. 25, 2021

(65) Prior Publication Data
US 2023/0099600 A1    Mar. 30, 2023

Related U.S. Application Data

(60) Provisional application No. 62/987,685, filed on Mar. 10, 2020.

(51) Int. Cl.
*F41H 13/00*     (2006.01)
*G02B 26/10*    (2006.01)

(52) U.S. Cl.
CPC ......... *F41H 13/005* (2013.01); *G02B 26/101* (2013.01)

(58) Field of Classification Search
CPC ........................... F41H 13/005; G02B 26/101
See application file for complete search history.

(56) References Cited

U.S. PATENT DOCUMENTS

| | | | |
|---|---|---|---|
| 5,870,421 A | 2/1999 | Dahm | |
| 10,368,061 B2* | 7/2019 | Colosimo | G03B 35/00 |
| 10,591,587 B2* | 3/2020 | Blanchard | F41H 11/00 |
| 11,029,392 B2* | 6/2021 | Colosimo | G01S 7/481 |
| 2006/0028374 A1* | 2/2006 | Fullerton | F41G 5/08 |
| | | | 342/67 |
| 2009/0084252 A1* | 4/2009 | Marquis | G01S 7/495 |
| | | | 89/1.11 |

(Continued)

OTHER PUBLICATIONS

International Search Report for PCT/US2021/021778, Dec. 10, 2021, 2 pgs.
Written Opinion for PCT/US2021/021778, Dec. 10, 2021, 5 pgs.

*Primary Examiner* — David A Vanore
(74) *Attorney, Agent, or Firm* — Danielson Legal LLC

(57) ABSTRACT

Methods and systems for the generation of non-lethal and lethal effects using ultra-short pulse lasers. A laser source generates pulses at the direction of a controller and directs the pulses along an optical path to one or more high-speed beam steering devices, also directed by the controller, which then directs the laser pulses to achieve the desired effects. A computerized controller receives a specification of one or more desired effects for one or more targets and calculates a distribution of ultra-short laser pulses as well as the required characteristics for each of the pulses.

18 Claims, 3 Drawing Sheets

(56) References Cited

U.S. PATENT DOCUMENTS

| | | | |
|---|---|---|---|
| 2010/0319526 A1* | 12/2010 | Imholt | F42D 5/045 |
| | | | 89/36.01 |
| 2014/0009811 A1* | 1/2014 | De Loor | G02B 26/126 |
| | | | 359/208.2 |
| 2014/0125964 A1* | 5/2014 | Jonas | F41H 13/005 |
| | | | 356/4.01 |
| 2015/0140241 A1 | 5/2015 | Hosseini | |
| 2016/0097616 A1* | 4/2016 | Weigold | F41H 13/0062 |
| | | | 250/396 R |
| 2017/0127507 A1* | 5/2017 | Hunt | H05H 1/46 |
| 2018/0128908 A1* | 5/2018 | Blanchard | F41H 11/00 |
| 2020/0013181 A1 | 1/2020 | Uyeno et al. | |
| 2020/0041236 A1* | 2/2020 | Hening | F41H 13/005 |
| 2022/0412700 A1* | 12/2022 | Sipes, Jr. | F41H 13/005 |

* cited by examiner

APPLICATIONS OF ULTRA-SHORT PULSE LASER SYSTEMS

CROSS-REFERENCE TO RELATED APPLICATIONS

The present application is a national phase application of International (PCT) Patent Appl. No. PCT/US2021/021778, filed internationally on March 10, 2021, and claims the benefit of and priority to United States Prov. Appl. No. 62/987,685, filed on Mar. 10, 2020, the entire disclosure of each of which is hereby incorporated by reference as if set forth in their entirety herein.

TECHNICAL FIELD

Embodiments described herein relate to methods and systems for applications of ultra-short pulse laser systems and, more particularly but not exclusively, to methods and systems for generating non-lethal and lethal effects using ultra-short laser pulses.

BACKGROUND

Ultra-short pulse laser systems (USPLs) are a class of laser characterized by a pulse width (pulse duration) of less than 1 picosecond (1 ps). Typical pulse widths range from 10 femtoseconds (fs) to 600 fs. The interaction of sub-picosecond pulses with the transmission medium (e.g., air, glass, or other matter transparent to the given laser wavelength) and self-interaction within pulses themselves result in physical effects distinct from those of longer laser pulses or continuous wave (CW) lasers.

Recent innovations in USPLs have enabled the production of USPLs with pulse repetition frequencies (PRFs) on the order of 50 MHz. As such, many high-energy pulses can be delivered to the same target area in tens of nanoseconds and/or multiple targets can be addressed with sequences of bursts.

The beam-focusing optics in USPL systems are compact and their size, weight, and cost are substantially invariant to range (distance to the point-of-focus); in contrast, focusing of longer-pulse and CW lasers requires the use of traditional optical systems, whose size (e.g., diameter) increases in proportion to range. Recent innovations in the implementations of USPLs have also dramatically decreased the size and weight of USPL laser systems and improved their wall-power (electrical) efficiency.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

Embodiments relate to the generation of non-lethal and lethal effects using ultra-short pulse lasers. A computerized controller receives a specification of one or more desired effects for one or more targets and calculates a distribution of ultra-short laser pulses as well as the required characteristics for each of the pulses. A laser source generates the pulses at the direction of the controller and directs the pulses along an optical path to one or more high-speed beam steering devices, also directed by the controller, which then directs the laser pulses to achieve the desired effects.

In one aspect, embodiments of the present invention relate to a system including a laser source having an optical path and generating ultrashort laser pulses having a beam axis and capable of a high pulse repetition frequency; at least one high-speed beam steering device in the optical path of the laser source; and a controller configured to use the at least one steering device to move the beam axis within a range of at least five degrees to implement a desired effect.

In some embodiments the at least one steering device is a mirror, prism, MEMS mirror device, or liquid lens. In those embodiments where the at least one steering device is a mirror or prism, the mirror or prism may be moving or spinning.

In some embodiments the controller is further configured to engage multiple targets within the system's field of view wherein inter-target engagement time/aiming is less than 10 ms. Engagement may include a plurality of laser pulses raster-scanned in the vicinity of each target. The controller may vary pulse repetition, per-pulse frequency content, beam divergence, peak pulse power, or wavelength to deliver varying effects to the engaged targets.

In some embodiments the controller is further configured to raster-scan a set of 100×100×100 points with sub-meter spacing at least 15 times per second at a mean distance of at least 500 m.

In some embodiments the system is mounted on a turret or gantry.

In some embodiments the laser pulses results in Kerr self-focusing at a targeted point downrange from the laser source.

In another aspect, embodiments of the present invention relate to a method comprising calculating, using a controller, pulse characteristics and distribution to achieve at least one desired effect; generating, using a laser source an optical path and capable of a high pulse repetition frequency, ultrashort laser pulses having a beam axis; and moving, using at least one high-speed beam steering device in the optical path of the laser source, the beam axis within a range of at least five degrees to achieve the at least one desired effect.

In some embodiments the at least one steering device is a mirror, prism, MEMS mirror device, or liquid lens. In those embodiments where the at least one steering device is a mirror or prism, the mirror or prism may be moving or spinning.

In some embodiments the controller is further configured to engage multiple targets within the system's field of view wherein inter-target engagement time/aiming is less than 10 ms. Engagement may include a plurality of laser pulses raster-scanned in the vicinity of each target. The controller may vary pulse repetition, per-pulse frequency content, beam divergence, peak pulse power, or wavelength to deliver varying effects to the engaged targets.

In some embodiments the controller is further configured to raster-scan a set of 100×100×100 points with sub-meter spacing at least 15 times per second at a mean distance of at least 500 m.

In some embodiments the system is mounted on a turret or gantry.

In some embodiments the laser pulses results in Kerr self-focusing at a targeted point downrange from the laser source.

BRIEF DESCRIPTION OF DRAWINGS

Non-limiting and non-exhaustive embodiments of this disclosure are described with reference to the following figures, wherein like reference numerals refer to like parts throughout the various views unless otherwise specified.

DETAILED DESCRIPTION

Figure 1:
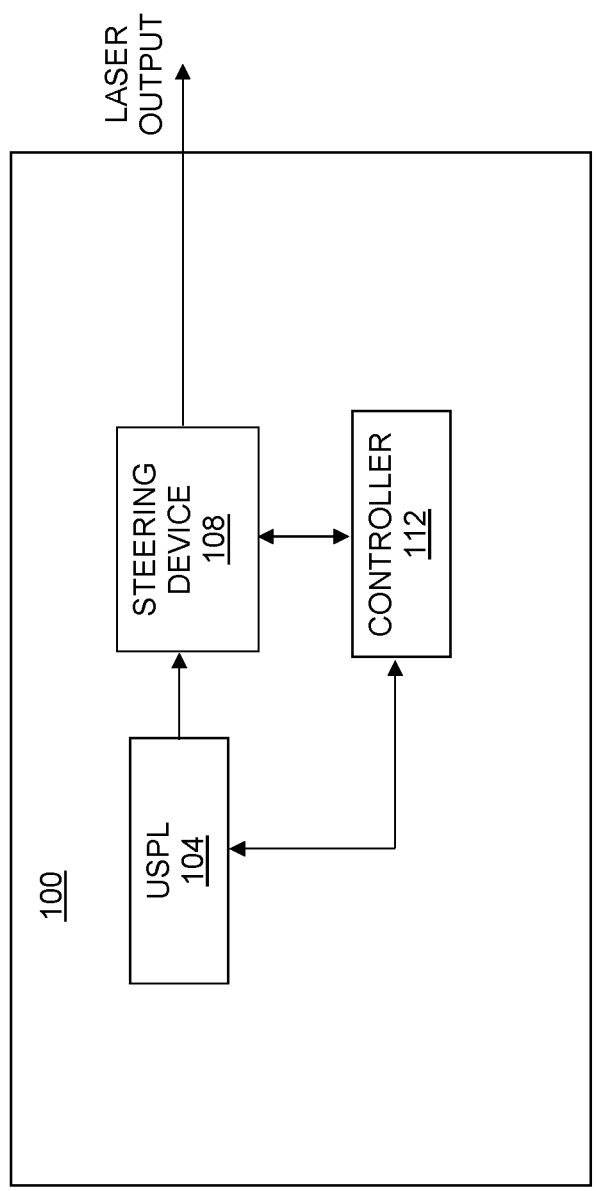
FIG. 1 depicts one embodiment of a system in accord with the present invention.

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

ACRONYMS USED

AI—Artificial intelligence
CW—Continuous wave
EM—Electromagnetic
EMI—Electromagnetic interference
fs—Femtosecond (1 e-15 s)
HE—High explosive
HRRT—High-speed random and raster targeting
Hz—Hertz (SI unit, 1/s)
IR—Infrared (light, wavelength>~740 nm)
ML—Machine learning
NLWS—Non-lethal weapons system; synonym: less-than-lethal weapons system.
PRF—Pulse repetition frequency (units of Hz)
ps—Picosecond (1 e-12 s)
RF—Radio frequency (electromagnetic radiation, 20 Hz to»100 GHz)
SWaP—Space, weight, and power
SWaP-C2—Space, weight, and power, cost and cooling
UAV—Unmanned aerial vehicle
UGV—Unmanned ground vehicle
USPL—Ultra-short pulse laser
USV—Unmanned surface vehicle (boats)
UUV—Unmanned underwater vehicle (submarines/submersibles)
UV—Ultraviolet (light, wavelength<~380 nm)

EMBODIMENTS

In general, existing laser weapons' optical systems' size and weight limit their ability to address multiple targets in a short period of time, e.g., to slew their point-of-aim by 20° in less than 10 ms. Additionally, existing anti-material laser weapons systems typically disable targets via heating (melting or burning) which requires irradiation of the target for a relatively long period of time (»100 ms).

Embodiments leverage the effects of ultra-short laser pulses for a variety of novel applications. These effects include, but are not limited to:

Air plasma production: When the instantaneous power of a laser pulse passing through air exceeds a critical threshold (about 1.6-2 GW), the air breaks down into a plasma filament—a downrange region of highly-ionized air along the laser's optical axis. The transfer of energy from the laser pulse to the air also causes heating of the air. The plasma itself contains an abundance of free electrons, and is thus conductive, and, in general, emits broadband EM radiation.

Air plasma heating: Depending on conditions, regions of air plasma may tend to absorb light, e.g., from subsequent laser pulses. The laser energy is substantially converted to heat, thus heating the plasma and the surrounding air. The heated air expands, producing a pressure wave—i.e., a sound wave.

Ablation: At higher peak pulse intensities (PPIs)—on the order of 1 TW or higher—ultra-short laser pulses intersecting with solids cause material ablation at the point-of-impact, wherein the target matter is converted into a plasma. Importantly, and in contrast to other methods, the damage caused by laser ablation does not involve heating the target (e.g., to cause melting or burning), but, rather, the direct conversion of the target matter to plasma.

Electromagnetic interference (EMI): Depending on pulse energy and other factors, laser-induced air plasmas can emit broadband (from RF to gamma rays) EM energy; when this EM energy interacts with, e.g., radios or other electronics, it causes electromagnetic interference (EMI). The extent of interaction between EMI and a target's radios or electronics can range from transient disruptions to the destruction of components.

Supercontinuum, broadband light: Depending on pulse energy and other factors, USPLs can produce bursts of "supercontinuum" (broadband) light emanating from a controllable downrange point in space. The spectral content of this light typically spans from IR to UV and can be very intense.

These applications and effects generally emanate from or are targeted at one or a small number of points in space. However, by leveraging certain characteristics of USPLs, a multiplicity of these effects may be projected over a wide field-of-view and volume at very high speed.

Additionally, ultra-short laser pulses exhibit a property called "self-focusing", wherein a pulse's electrical and magnetic fields' interactions cause the pulse's light to converge (i.e., focus) at a particular, controllable distance. By appropriately varying the characteristics of the pulse's light (e.g., pulse repetition, per-pulse frequency content, beam divergence, peak pulse power, or wavelength), individual pulses can be delivered to different locations without requiring the reorientation of the laser source or the reorientation of a beam steering device.

This enables embodiments of the invention to engage multiple targets in a region without being limited by overshoot, inertia, or other limiting characteristics of the systems used to reposition laser sources or beam steering devices. Embodiments of the present invention are typically able to engage multiple targets within the weapons system's field-of-view wherein inter-target engagement time/aiming is less than 10 ms; that is, the system's point-of-aim can slew full-scale in both azimuth and elevation in less than 10 ms.

In general, the effects and applications described in this document, unless otherwise specified, are envisioned for installation or deployment on a wide variety of platforms. The SWaP of USPL systems is low enough that generic or specialized systems can be built to suit almost any platform in use. More specifically, the effects and applications described herein are suitable for installation or deployment on and/or optimization for platforms including, but not limited to, manned aircraft, UAV, drones, UGV, UUV, USV, surface vessels (manned ships, boats, etc.), submarines, ground vehicles, small arms/weapon-mounted, personal/body, permanent/semi-permanent ground installations, portable, self-contained units, and space assets (e.g., satellites).

Each platform imposes distinct constraints, capacities, and requirements on various design aspects of the system, including, inter alia, physical dimensions (space/volume), weight, power, environment (e.g., temperature, moisture, vibration), intended use cases/applications/mission scenarios, target types (e.g., human vs. material vs. ordnance), legal and/or treaty obligations, safety, reliability, cost, heat management (cooling), range (distance to target), targeting capabilities, etc. For example: manned platforms are typically larger and have more generous (or less-restrictive) SWaP requirements than unmanned or portable platforms; airborne platforms generally impose more weight, flight-worthiness, and power consumption requirements than surface or ground platforms; systems in unmanned platforms typically require more platform-local autonomy, automation, and intelligence than in manned platforms; USPL systems underwater platforms require specialized waterproofing and other distinct physical design requirements; and portable devices (weapon-mounted or human-mounted) are generally very power- and weight-constrained and must have simple, reliable user interfaces.

FIG. 1 shows one embodiment of a system 100 in accord with the present invention. The system 100 is typically packaged in a housing or case of some kind to render it immune to weather and other adverse conditions. The system 100 includes at least one source of ultra-short laser pulses 104, one or more high-speed beam steering devices 108, in the optical path of the laser source, and a controller 112 in communication with the laser sources 104 and the steering devices 108.

Although one of each component is illustrated in FIG. 1 for simplicity, one of ordinary skill will understand that the appropriate number of each component will necessarily vary from embodiment to embodiment, and will depend in part on size limitations, thermal constraints, power limitations, budgetary restrictions, etc.

Although not illustrated, some embodiments may also include on-board and/or external power generation and/or power storage systems; on-board and/or external cooling/heat extraction systems; and on-board and/or external targeting, fire control, tracking, or safety systems.

One of ordinary skill would also understand that a multiplicity of systems 100 deployed in distinct locations may be controlled or coordinated from a single location including controller 112 or super-controller functionality.

The laser source 104 is typically a USPL capable of producing down-range effects at specific points in space along its optical axis and is capable of a high pulse repetition frequency (PRF). Typical laser sources 104 suitable for use include Ti-sapphire lasers and dye lasers.

The beam steering devices 108 are capable of full-scale angular deflections at millisecond time scales. Suitable beam steering devices 108 include mirrors, prisms, MEMS mirror devices, or liquid lenses, either individually or arranged together (moving, spinning, stationary, etc.) typically to permit movement of the beam axis of the laser pulses within a range of at least five degrees. The combined effect of all beam steering devices on the angular range of the system's 100 beam axis is typically at least ±15° in azimuth and elevation. Many embodiments will also utilize Kerr focusing to terminate a laser pulse in a particular location of interest to achieve a desired effect.

The controller 112 can take a variety of forms, including general purpose and application-specific computers. The controller 112 can accept a variety of inputs from an operator, such as a specification of one or more lethal or non-lethal effects to be applied to one or more targets in the field of view of the system 100. With these inputs, the controller 112 calculates the characteristics of the laser pulses as well as the distribution required to implement the desired effects for the specified targets. The system 112 controls the laser sources 104 to generate the pulses with the desired characteristics and the beam steering devices 108 to deliver the pulses in the desired distributions.

The controller 112 may also include a variety of AI/ML techniques to allow for the automated selection of targets and effects in lieu of or in addition to those specified by the human operator. As mentioned above, the system 100 may take advantage of the self-focusing properties of the laser sources 100 to permit pulses to be directed to varying locations without the intervention of the beam steering devices 108. In some embodiments, under operation of the controller 112, the laser source 104 and steering devices 108 can be used to move the beam axis over a continuous range of five or more degrees along one or more axes while the remainder of the system remains stationary.

Figure 2:
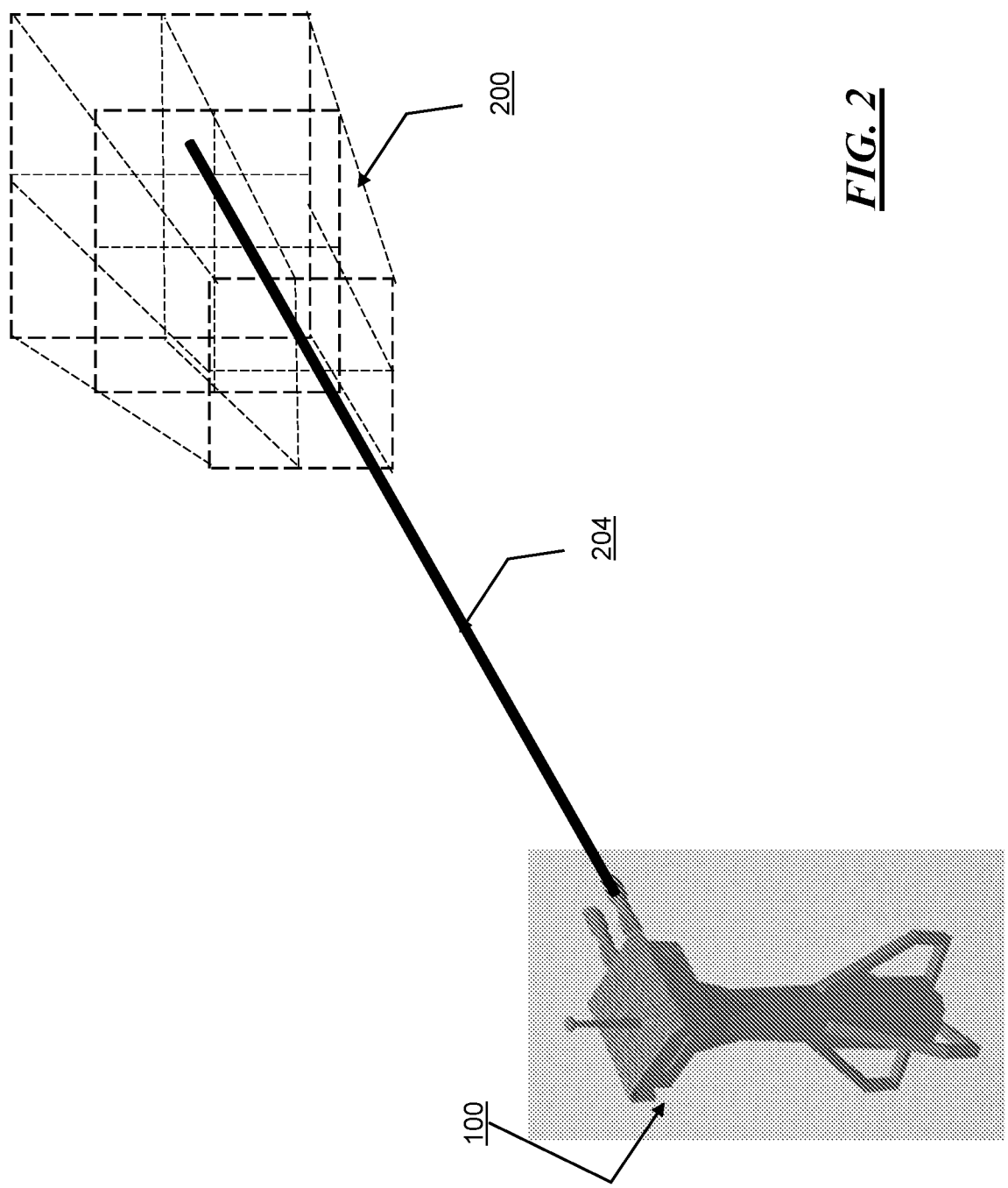
FIG. 2 depicts an embodiment of a system operating to achieve one or more desired effects for a specified target.

FIG. 2 shows an embodiment of the system 100 in operation. As shown, the system 100 has been deployed in a turret configuration. Mounting on a turret (or a gantry or equivalent system) extends the net angular range in azimuth of the system 100 by enabling rotation of the system's optical and laser assembly about a plane parallel to the ground. Similar extensions to the net angular range of elevation can be achieved by enabling rotation about a plane parallel to the laser's optical axis and perpendicular to the ground. The net angular range in azimuth and/or elevation of the system may also be extended by means of a beam director or other system where relay and exit optics are rotated (in yaw and pitch) while the laser assembly itself remains stationary. Such a system may be installed on and used from a manned or unmanned aircraft, ground vehicle, or surface vessel (boat or ship).

The controller 112 has accepted or identified a target and a desired effect and calculated the characteristics for a plurality of ultra-short laser pulses to be delivered to a relevant volume 200 to cause the desired effect to the target. For example, the system may have been configured to deafen a ground-based target, and the controller 112 has determined that it will achieve this effect by using laser pulses to generate air plasmas in the volume 200 and subsequently heat those plasmas with appropriately configured laser pulses, causing pressure waves perceived by the target as "booming" noises or thunder.

As illustrated in FIG. 2, the calculation and execution can involve the division of the volume 200 into a plurality of sub-volumes. For simplicity of illustration, the volume 200 is depicted as being subdivided into equal sub-volumes, although it is to be understood that the subdivision can be into an arbitrary number of sub-volumes of arbitrary sizing, as the controller 112 may determine necessary to achieve the desired effects with respect to the targets of interest.

Similarly, it is to be understood that the system 100 may disperse an arbitrary number of laser pulses (appropriately configured) throughout the volume 200 in order to achieve the desired effect. Some effects may utilize a uniform distribution. Others may rely on a distribution where some sub-volumes receive more pulses than other sub-volumes. Some effects may utilize random pulse projection or, alternately, raster scanning over an area or volume. The magnitude and amplitude of specific effects can be varied in real-time on a per-point or per-voxel basis.

Embodiments of the present invention are typically capable of raster-scanning a set of points within a down-range voxel or voxels (a range of azimuth, elevation, and distance) such that a mesh of 100×100×100 points with ≤1 m spacing is projected over a volume at 15 Hz or more (or equivalent) (15 M points/second over a 100×100×100 m volume) at a mean distance of 500 m from the weapon.

Figure 3:
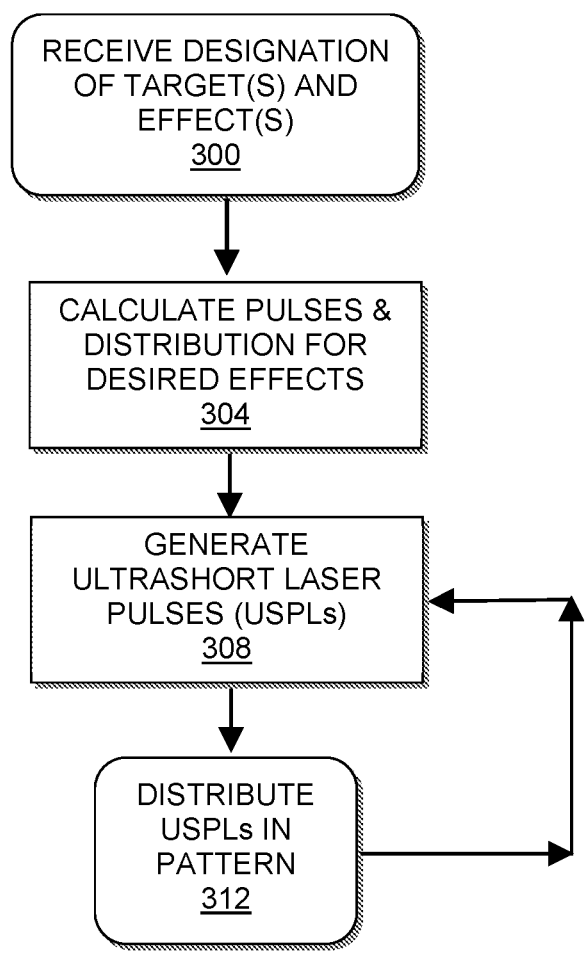
FIG. 3 is a flowchart of one embodiment of a method in accord with the present invention.

FIG. 3 describes an embodiment of a method in accord with the present invention. One or more targets and one or more effects are designated, e.g., by an operator, by AI/ML, by a targeting computer, etc. (Step 300). A distribution of laser pulses and appropriate characteristics for those pulses are computed to achieve the desired effects with respect to the designated targets (Step 304). Pulses are generated having the computed characteristics (Step 308) and distributed as computed (Step 312), with the process iterated to deliver the desired effects to the designated targets.

Applications

Vehicle Disablement

A USPL can be used to disable a downrange vehicle by causing permanent damage to one or more of the vehicle's tires; such damage may be thermal (e.g., melting or burning of the tire) and/or ablative (i.e., ablating material from the tire). High PRF enables tire destruction even for moving vehicles. This method provides personnel with a non-lethal method for disabling vehicles at long ranges and provides many advantages over engagement with lethal weapons. Some embodiments may use wavelengths, such as IR, with high absorption in tire materials (typically combinations of natural and synthetic rubber with steel or fiber reinforcement). Some embodiments may additionally comprise specialized targeting algorithms, to include AI/ML techniques, to enable the effective destruction of "run-flat", solid, or armored tires.

Active Armor Countermeasures

Active or ablative armor provides tanks and other armored vehicles, buildings, etc. protection from certain classes of projectiles (e.g., kinetic weapons). Active armor typically comprises plates or sheets of high explosive mounted on the exterior of the vehicle; the impact of an incoming projectile causes the armor to detonate and directs the energy of the projectile away from the vehicle, protecting its primary armor and the vehicle's occupants.

USPLs can be used to neutralize active armor by detonating the armor's high explosive (HE) contents. Detonation of HE may be by means of heating by one or more pulses of IR or other wavelengths readily absorbed by HE. Detonation of HE may be by means of high-intensity pressure waves generated by heating air plasma proximate to the target. Detonation of HE may be by means of ablation of outer non-HE armor layers followed by heating and/or pressure wave generation.

USPL weapons' targeting systems can be coordinated with the targeting and fire control of ballistic/kinetic weapons (e.g., anti-tank rounds or missiles) such that the target's active armor is neutralized by the USPL weapon prior to impact by the ballistic/kinetic round(s). In some embodiments, this coordination will include algorithms, to include AI/ML techniques, to: minimize the effect of the exploding active armor on the efficacy of the subsequent ballistic/kinetic round(s); optimize the area of neutralized active armor based on the accuracy/precision of the ballistic/kinetic weapon(s); and/or coordinate multiple USPL weapons systems to concurrently neutralize larger areas of active armor or effectuate such neutralization more rapidly.

Anti-active-armor USPL systems may be integrated into existing or future anti-armor weapons systems, such as tank canons or anti-tank aircraft systems. In other embodiments, USPL systems may located physically separately from the primary anti-armor weapons system and operated in coordination with one or more physically-separate/independent weapons systems to disable armor on multiple targets.

In some embodiments, this method of neutralizing active armor is further used to kill or neutralize personnel or damage material proximate to the target. In some embodiments, the destruction of active armor may be used as a less-than-lethal method of repelling or deterring the advance of hostile targets and/or disabling targets' active armor from beyond their weapons' range. USPL systems capable of detonating the HE of active armor may also be used to detonate other HE devices, such as improvised explosive devices (IEDs), mines, or other munitions.

Sound Pressure Wave Generation

USPLs are capable of generating high-intensity (>200 dB) sound/pressure waves ("shockwaves") that emanate from a selected point downrange. These shockwaves are typically produced by using the USPL to create air plasma filaments and heat said plasma filaments. Shockwaves can cause direct damage to some targets, particularly targets comprising brittle materials such as glass, ceramics, and some plastics. Damage or destruction of targets by means of USPL shockwaves provides a non-lethal (or less-than-lethal) means to neutralize or deter targets. For example, this method could be used to damage or destroy vehicle windshield or window glass, microwave antenna arrays, optical components, etc. This method may be used against UAVs or other materiel that can be damaged or destroyed by shockwaves or extreme vibration.

Shockwaves can also be used to disrupt the inertial guidance systems in UAVs or guided munitions, causing the target to crash, disabling the target, throwing it off course, and/or denying it entry into a particular area.

Vibrations induced by repeated shockwaves proximate to a target may be used to jam or blind sensitive microwave or optical sensors. Some embodiments may comprise a sensor and controller, to include AI/ML algorithmic techniques, that controls the weapon's pulse repetition frequency (PRF), senses the effect on the target, and adjusts the PRF to match the target's resonant frequency (or mode), resulting in disruption, damage, or destruction of the target.

Some embodiments may comprise a sensor and controller, to include AI/ML algorithmic techniques, that optimizes the weapon's power and targeting such that the likelihood or magnitude of collateral damage to humans/personnel is minimized while still achieving the desired damage of or disruption to the target (for example, if the target is a glass pane, the system would choose a point on the pane such that the laser beam would not intersect with a person, a person's eye, etc.).

Other applications of USPL shockwaves may include projecting shockwaves proximate to the surface of a body of water to create underwater acoustic effects. The underwater sound thusly generated may be used to: confuse or acoustically-blind enemy SONAR systems; in place of a SONAR transducer such that active SONAR techniques can be used without revealing the location of friendly vessels; and/or for producing false acoustic signatures, e.g., of surface vessels, to misdirect enemy submarines, torpedoes, or other systems.

Optics & Imaging Countermeasures

Optical sensing systems, e.g., digital cameras ("cameras") typically contain functional elements such as lens systems and digital sensors (such as CMOS or CCD sensors). These functional elements can be blinded, disabled, or destroyed by USPL systems.

Blinding and/or disablement of cameras using USPLs may include methods such as: causing permanent damage to the camera's optical system, e.g., due to extreme heating caused by Kerr lensing in the optical system; and/or causing permanent damage to the camera's sensor(s); controlling pulse shape and dispersion such that the camera's sensor is blinded (overwhelmed or saturated) without causing permanent damage to the camera and/or while reducing the likelihood of injury to personnel, reducing the risk of igniting the target, or otherwise reducing the risk of damage or injury to the target and its surroundings.

In some embodiments, the USPL is capable of emitting light in multiple wavelengths (individually or severally) and a wavelength or wavelengths are chosen for optimal efficacy against the target (e.g., based on the composition of the camera's lens) and/or to overcome protective measures (such as IR or other filters).

In some embodiments, the USPL is aimed and fired such that the camera's lens is surreptitiously damaged (e.g., such that the damage is not immediately obvious from visual inspection of the camera), e.g. by using thermal effects to cause damage to multi-element lenses (e.g., delamination or misalignment), causing fogging (e.g., by melting plastic elements or interactions with lens coatings or adhesives), causing temporary or permanent changes in the lens geometry (e.g., due to thermal expansion), etc.

In some embodiments, the USPL is aimed and fired such that the camera's sensor is damaged at selected points or over selected regions, e.g., to create "blind spots" or to occlude certain areas of the camera's field-of-view with less likelihood of immediate detection by someone monitoring the camera's video feed.

A USPL system can be used in a non-lethal manner (e.g., as part of an NLWS) wherein the system is designed to target and disable weapon-mounted, helmet-mounted, or other portable optical systems, such as night vision scopes, range finders, or IR scopes. Such systems may further incorporate targeting and laser power controllers, to include AI/ML techniques, that optimize damage to the target optical system while minimizing the likelihood of injury to humans.

Penetrating Trauma

A USPL can be used to cause lethal injuries to human targets by firing a multiplicity of pulses at one or more points on the body, such as the heart, abdomen, or base of the skull, causing the ablation or destruction of tissue and the production of a lethal or disabling wound. Typically, such a system would be capable of penetrating clothing, body armor, and other materials occluding the target area of the target's body.

The system may include a sensing and fire controller, to include AI/ML algorithmic techniques, that identifies a specific area on the target, senses the location of laser pulses hitting the target, keeps the laser aimed at the chosen area on the target, and/or automatically ceases firing upon disablement of the target or if the target is occluded.

In the preferred embodiment, the system's fire controller, to include AI/ML algorithmic techniques, includes controls to specifically prevent the intentional infliction of eye damage to targets (intentional infliction of eye damage is a violation of international law/treaties).

Some systems with lethal capabilities may also be capable of non-lethal effects; this provides the user a range of responses to a potential threat and the ability to rapidly transition from non-lethal to lethal engagement of a non-compliant target using the same USPL weapons system.

External Trauma

USPLs are capable of generating high-intensity (>200 dB) sound/pressure waves ("shockwaves") that emanate from a selected point downrange. Previous work has shown that high-intensity sound can be lethal to humans via several mechanisms. A USPL system can be used to produce high-intensity shockwaves in close proximity to a human target for the purpose of killing or disabling the target.

In one embodiment, the system produces shock waves proximate to the target's head at a rate that matches or is adjusted to the resonant frequency of the target's skull/head; this results in lethal brain damage to the target.

In other embodiments, the system produces high-intensity shock waves aimed close to the target's abdomen or head, producing an effect equivalent to blunt-force trauma; one or more such shock waves will cause effects such as internal organ damage, cardiac arrest, severe concussion, or other disabling or lethal trauma.

In some embodiments, the system, under manual or automatic control, can vary the amplitude of the shock waves and/or the targeted point in space such that the system is able to produce a range of non-lethal and lethal effects; shock waves emanating from a point more distant from the target and/or at lower amplitude create unpleasant or painful, non-lethal effects, but as the point-source is moved closer to the target and/or the amplitude is increased, the effects become lethal, as described above.

Miscellaneous Effects

USPL weapons systems are capable of a wide range of lethal and non-lethal effects against human targets as well as a range of capabilities against vehicles, materiel, and other non-human targets. USPL weapons systems' effects can be projected from contact range out to multiple kilometers.

Embodiments permit, inter alia, the user/operator to control the level of response and escalate or deescalate, as appropriate, in response to threats. The system can use one or more USPLs to simultaneously generate multiple downrange non-lethal effects (ranging from audio commands, disorienting sound and visual effects, and superficial thermal discomfort) and lethal effects (including shockwave-induced blunt-force trauma and lethal penetrating trauma). The same USPL can be used against non-human targets, at range, with minimal risk of collateral damage compared to conventional kinetic weapons.

In some embodiments, the lethal capabilities are disabled via configuration or permanent changes to the weapon's controller(s), the USPL's power, optical systems, and/or other modifications. A controller may allow supervisory operators to program a permissible range of responses and engagements, e.g., based on specific mission and rules-of-engagement parameters.

Defensive

In some embodiments, the system includes an additional laser power gain stage that, when activated, increases the weapon's peak pulse power and enables higher-power ablative and other effects against land, surface, and air targets and increases the weapon's maximum effective range.

Higher-power embodiments of USPLs, e.g., systems including a laser power gain stage, can be used to protect forces and assets from incoming weapons, such as missiles, ballistic projectiles (e.g., artillery rounds), rockets, and/or unmanned vehicles (UAVs, UGVs, USVs, etc.). The means of protection may be by: damage or disruption to a guided weapon's control or guidance systems; destruction of the incoming projectile or vehicle and/or detonation of on-board explosives, warheads, etc; disabling deployment or activation of the weapon's payload (e.g., disabling arming or fuzing systems); and/or damaging, blinding, or otherwise disabling or interfering with the incoming projectile or vehicle's optical guidance system(s).

Audio

A USPL can be used to generate pressure waves in air emanating omnidirectionally from a remote point in space. If the magnitude and/or frequency of the pressure waves is modulated over time, said modulated pressure waves will result in audible sound projected omnidirectionally from a point in space and can faithfully reproduce audio signals containing frequency content from 20 Hz to 20 kHz (the range of human hearing). Embodiments can be used to provide a USPL-based public address or virtual speaker system based on the principle of modulated USPL-generated pressure waves emanating from a controllable point in space that can be used to transmit live or recorded voice, music, or other audio content from multiple points in space that can be moved in real-time relative to the listeners. Projecting sound from two or more nearby points in space can provide a directional sound source by selecting the point sources to cause constructive and destructive interference. The system can be used in place of or in addition to conventional speakers at public gatherings, entertainment events, sporting events, for public safety communications, or other circumstances where a traditional public address system is used.

Embodiments can generate intense bursts of sound emanating from remote points in space sounding (perceptually, to the human ear) like explosions, gun fire, or other sounds commonly present on a battlefield or in combat; and wherein the timing, content, and/or locations of the bursts of sound are designed to mislead the enemy. The system may be used to conceal the location of snipers or other covert actors in place of or in addition to traditional cover or suppressive fire. The system may be used in a mode where sound bursts are accompanied by flashes of light. Sound bursts may be generated in pairs to simulate the firing of a weapon and the impact of the projectile. The embodiments may accurately reproduce the reports of specific types of weapons.

Simulated Pyrotechnics

Embodiments can be used to create visual effects such as linear or spherical bursts of light by means of laser-induced air plasmas. The system can be used as a substitute for pyrotechnic effects per se or in situations or locations where the use of pyrotechnic effects is prohibited and/or access to or use of pyrotechnic devices is restricted. The system may also use a USPL to produce audible sound in conjunction with or in synchrony with the plasma-based visual effects or other effects.

The system may be used at public gatherings, entertainment events, sporting events, or other circumstances where traditional pyrotechnics or fireworks would be used. The system may be used in conjunction with traditional pyrotechnics or fireworks. When used in conjunction with traditional pyrotechnics or fireworks, the system may include sensors and/or use intelligent algorithms, to include AI/ML techniques, to maintain perceptual synchrony or coherency between USPL- and traditionally-produced effects.

The system may be used in conjunction with traditional pyrotechnics, fireworks, or fog/smoke machines wherein additional effects are produced from the interaction of the USPL (at one or more wavelengths) with particulate residue or vapor (smoke or fog); such interactions may or may not involve laser-induced plasma.

Anti-Satellite Applications

USPL can be used to disable or render non-functional space-based satellites or other space assets ("targets") such that the disablement of targets results in little or no net-new space debris. The target may be disabled via the oblation of some part or parts of the target, damaging destroying, or disrupting the target's optical system(s), electrical systems, radios, antennae, computer systems, guidance or navigation systems, or power systems.

Triggering Avalanches

In avalanche-prone areas, it is common practice to intentionally trigger smaller or more controlled avalanches to prevent larger, more destructive avalanche events. Typically, high-explosive (HE) charges or rounds are dropped on or fired at specific slopes and the shockwave(s) of the detonating HE triggers such avalanches. This method is generally effective, but requires access to and the purchase, storage, handling, and deployment of significant quantities of HE, typically by licensed, specially-trained personnel. The chemical contents of HE (many of which are toxic or harmful to humans and other animals) may also raise safety and environmental concerns.

Embodiments may be used to trigger avalanches using USPL-generated shockwaves. Typically, the effective range of such a system would be 5-10 km. Such a system may be used in place of or in addition to explosive devices to prophylactically trigger avalanches; the systems may be fixed, mobile, and/or airborne.

Because USPLs are power-efficient and compact and avalanche triggering in a particular zone is relatively infrequent (e.g., every few days), stationary, permanent or semi-permanent, solar-powered systems could be deployed throughout an area and controlled remotely as needed via wireless radio or satellite networks. Typically, such systems would comprise a compact USPL system, a solar panel array, and an electrical energy storage device such as a battery pack or supercapacitor. Some systems may also include cameras and other sensors for targeting, surveillance, feedback, etc., and may incorporate mechanisms on their exit optics to prevent the formation of or remove frost, ice, or other debris from the external surfaces of the optics; in some embodiments, the laser itself may be used for safely de-icing its own optical system.

Animal Deterrence

In a variety of circumstances, it is desirable to disrupt or deter non-human animals from particular areas or routes without harming the animals. Embodiments can be used to disrupt groups of animals or deter animals from entering or approaching designated areas by means of USPL-generated sound with minimal risk of harm to said animals. The sound can be changed over time to mitigate the tendency of animals to acclimate to changes in their environment.

For example, embodiments may be used to disrupt or deter birds or flocks of birds from entering or lingering around airfields or high-risk flight paths near airfields, animals from entering agricultural areas, or dangerous animals (e.g., bears, big cats, moose) from entering populated areas.

Embodiments may be used to generate audio that simulates predators or other sounds known to ward off or disrupt certain animals; in some cases, the USPL may be targeted such that the audio emanates from a location consistent with the simulated sound (e.g., the call of a hawk coming from high in the air or in a tree). In some cases, the USPL may be targeted such that, in addition to audible effects, the shockwaves cause movement in the animals' surroundings (e.g., disturbances in leaves or grass).

In some embodiments, USPL systems may be used instead of or in conjunction with traditional physical fencing to control or restrict the movement of livestock. In some cases, multiple systems may be used in coordination to create a larger virtual fence or to herd animals in a specific direction. Sonic effects may be combined with or supplemented by other non-lethal effects, such as thermal discomfort, to effectuate the desired animals' movements.

Fire Containment

One method of containing or controlling wildfires/forest fires is to create what are known as "controlled burns", wherein firefighters intentionally set fire to, e.g., dry grasses, in chosen areas to create a fire break or remove available fuel to prevent the spread of the larger wildfire. Typically, controlled burns are set by firefighters using torches or equivalent equipment; this necessitates the deployment of firefighters to the controlled burn locations and potentially puts them in harm's way.

Compact, airborne USPL systems in accord with the present invention, operating typically in the infrared wavelengths, can be used to create controlled burn zones, e.g., for controlling wildfires. The laser power and optics of such systems would be configured/controlled such that one or more laser pulses are able to ignite flammable material, such as dry grass or leaves, at a selected point. In some embodiments, the USPL's targeting and fire controller could be configured to ignite material according to a precise, predetermined set of instructions (e.g., along a line or over a specific area), optionally in conjunction with inputs from a human operator.

In some embodiments, the USPL system would be installed in/on a manned aircraft, such as a helicopter. In other embodiments, the USPL system may be installed on an unmanned aircraft (UAV), drone, or equivalent platform.

Another method for controlling wildfires is to create fire breaks by physically removing material (potential fuel) from a chosen area; again, this requires deploying firefighters or other workers to the given area and is typically labor-intensive and/or requires bringing in excavation equipment.

Similarly, embodiments of the present invention can create fire breaks using the ablation effect described above. In contrast to burning, ablation destroys material by vaporizing it with minimal heating. We believe that ablation would be effective for the removal of material such as grass, leaves, and small plants with minimal risk of ignition of the fuel materials. Typically, this system's fire control and targeting system would include additional sensors, such as cameras, to assess efficacy, and would be programmed to progressively ablate material to create the fire break with minimal probability of ignition and according to a precise, predetermined set of instructions, optionally in conjunction with inputs from a human operator. The system would typically be deployed on a manned helicopter platform or a UAV or drone capable of hovering or slow flight. In some cases, multiple systems may be used in coordination to cover a larger area.

Area Denial and Force Protection

Embodiments of the present invention may be used for area denial, i.e., projecting effects across a particular down-range area in a structured (e.g., grid, mesh, or matrix) or targeted/adaptive (e.g., rapid targeting of multiple distinct areas) manner.

In one embodiment, non-lethal effects are used to deter or displace human targets from a particular area or areas. An example of such an application is perimeter security (e.g., exclusion zones) around a base or other asset(s). Multiple effects, such as flash-bang and voice commands, may be combined. The specific effects and their amplitudes may be modulated or varied over an area or areas, e.g., with amplitude decreasing in proportion to distance or with more energetic effects targeted at higher-threat targets. Some embodiments may be capable of allowing personnel to escalate to lethal force against non-compliant targets.

In another embodiment, anti-materiel/anti-incoming effects are used to deny non-human assets, weapons, projectiles, etc. from a particular area or areas. For example, HRRT could be used to project a virtual "wall" comprising ablative and/or shockwave effects to repel or destroy enemy UAVs, drones, drone "swarms", or multiple projectiles (e.g., rockets). The virtual "wall" may be preferred to other defensive measures against targets with small RADAR cross-sections or which are otherwise difficult to track and target with conventional techniques. In some embodiments, the HRRT system's fire control and targeting system uses sensors to detect hits against targets and adjust its firing pattern accordingly, e.g., to increase the density or intensity of fire in the area near the presumptive location of a target.

Generalized Shield

In some applications, the system is capable of and programmed to deliver non-lethal, lethal, and anti-materiel/anti-incoming effects individually, severally, sequentially, or concurrently to provide a generalized "shield" around an asset.

In some embodiments, the system's fire control and targeting system may incorporate advanced algorithms, to include AI/ML techniques, to classify threats, determine which effect(s) to use against each threat, and prioritize threat engagement; for example, an incoming missile might be prioritized above a distant unarmed drone or a soldier armed only with a rifle.

Typically, humans would make the final fire control decisions (e.g., "pulling the trigger") involving human or manned targets while fire control decisions against unmanned targets may be semi- or fully-automated.

Typically, an HRRT system would include a robust safety system (comprising aspects of targeting, fire control, policies, integration with external sensor systems, etc.) for preventing injury or damage to own-force personnel or assets. In some embodiments, the safety system can be configured with a minimum target range and will not engage targets closer than said range. In some embodiments, the safety system includes the ability to avoid along a trajectory that would intersect with manned aircraft for the purpose of, among other things, avoiding eye injury to pilots or passengers. In some embodiments, the safety system may detect or be informed of the locations and/or movement of friendly forces or assets and disable firing within some 3D area around said friendly forces or assets.

Time-Multiplexed, Multiple-Target Engagement

Because of its high-speed beam control and high PRF, embodiments of the present invention are capable of engaging multiple disparate targets essentially simultaneously—a technique known in networking and communications as time-division multiplexing (TDM). Among other things, this enables the system to engage many targets within its field-of-view concurrently, i.e., without having to prioritize the order-of-engagement. In contrast, existing defensive systems typically can only address one target at a time and there is a delay when changing targets. The envisioned system's range (5-10 km) also enables earlier engagement, which is critical against high-speed (supersonic or hypersonic) threats, such as missiles. TDM also avoids having to "commit" to a specific target, potentially at the risk of failing to stop another target.

In some embodiments, the system's engagement with a single target comprises multiple laser pulses that are raster-scanned in two or three dimensions. Leveraging the speed of light and the high PRF of the USPL, the system is able to deliver tens or hundreds of "rounds" over a particular volume in about a microsecond. This aimed raster-scanning fire has several benefits:

By covering a volume containing the target, the system may be able to deliver multiple hits from a single "burst", increasing the likelihood of neutralizing the target.

The increased coverage volume compensates for and mitigates inaccuracies and uncertainty in target-tracking systems. Likewise, it can enable the system to effectively use less-accurate target-tracking systems, e.g., that would not be effective for controlling guns or unguided munitions.

As the position and trajectory estimates of the target improve, the system can adjust the shape and size of the targeted volume to zero in on the target and increase efficacy.

Multiple targets, such as missiles, originating from the same distant location (e.g., an aircraft, ship, or missile launcher) will subtend a relatively small fraction of the system's field-of-view; if several of the targets are travelling towards the system, they will tend to be contained within a relatively small solid angle (region of a sphere) for much of their flight. The aimed raster-scanned method is thus able to cast a variable-sized "net" over a set of targets, delivering concurrent, sustained fire at all targets.

Integration with Kalman Filters

Most target-tracking systems use an algorithm based on a Kalman filter, Extended Kalman filter, or similar model-based tracking error reduction algorithm. These algorithms maintain and update an error estimate matrix; in general, this matrix quantifies the uncertainty of the current tracked location, velocity, etc.

In some embodiments, the system adjusts the position, shape, spacing, etc. of its raster scanned volume according to the error estimate matrix of a Kalman filter, Extended Kalman filter, or similar tracking/feedback system. In some embodiments, the system may also contain sensors or receive external sensor data enabling it to detect if the target has been hit (or not); this information itself can be fed back into the Kalman filter (or equivalent) to improve its tracking accuracy. Additionally, the effective sample rate and response time of this feedback can be orders-of-magnitude better (higher sample rate, faster response time) than the targeting system's other sensors (such as RADAR or optics).

In some embodiments, the system may be used as a supplementary aiming/targeting system for other weapons systems (e.g., anti-aircraft missile systems), e.g., against larger or harder targets such as manned aircraft.

Flying Insect Control

Embodiments of the present invention can be used to control or eliminate insect targets, such as locusts, cicadas, and mosquitoes, by killing, disabling, and/or redirecting swarms of insects or individual insects or preventing or reducing insect incursion into or access to a designated area or areas using the non-lethal and lethal effects and targeting modes discussed herein. The enables the protection of agricultural lands, farms, livestock, sensitive habitats, etc., and humans from disease- or parasite-carrying biting insects and slowing or preventing the spread of insect-borne diseases or parasites (e.g., malaria, dengue fever, Zika, etc.).

In these embodiments, the system may include a targeting system or other mechanism that avoids or prevents disruption the movement of or injury to non-insect flying animals (e.g., birds, bats) or avoids or prevents firing the weapon in a direction where the laser beam would intersect a human, aircraft, vehicle, or otherwise cause damage to persons or property or where audible effects would cause injury or damage to humans or property.

One or more systems may be deployed in distinct locations (fixed or mobile) with overlapping areas-of-effect and, individually or severally, used to create a barrier against flying insects. In some cases, such a barrier may be used to prevent the spread of swarms of destructive insects (e.g., locusts) across geographic or political borders. In some cases, such a barrier may be used to protect a particular volume, e.g., enclosing a camp, hospital, settlement, etc., from the ingress of disease- or parasite-carrying insects.

As insects are small and are killed by tiny amounts of laser power (compared to humans or materiel), some embodiments of the system may be portable and worn, e.g., on the body or a helmet to provide personal protection against insects; physically-small(er) systems may also be used in place of or in conjunction with traditional prophylactic methods, such as mosquito netting and/or near likely points of insect ingress, such as windows and doors.

EMI/Jamming

At sufficiently high energy levels, USPL-generated air plasmas contain enough free electrons (charge carriers) to produce broadband electromagnetic interference (EMI). EMI can be used to interfere with ("jam") radio communications; RF jammers are commonly used in military applications to prevent or disrupt enemy communications. A disadvantage of conventional jamming techniques, which comprise high-power transmissions over the RF bands of interest (or broadband noise), is that they also jam own-force communications.

USPL-generated EMI emanates from a controlled point in space—typically, far away from the laser itself (and thus the friendly forces). Compared to conventional jammers, this EMI itself is relatively low-power, but, due to its proximity to the target (the radio system to be jammed), enough power is delivered to the target's receivers to block communications. This blocks the enemy's communications while allowing own-force communications.

Therefore, embodiments of the present invention can be used to generate localized EMI to jam or disrupt radio communication. The system may be configured to produce broadband/wideband EMI spectral content and/or to have higher power in certain bands. The system may further modulate the EMI to defeat countermeasures. The EMI content may also be shaped and/or targeting may be adjusted to directly disrupt or damage the target's electrical/electronic systems. Some systems may project the localized EMI effect to jam a specific target, such as an enemy antenna system.

Some systems may use raster-scanning (e.g., HRRT) to create an area or volume of RF denial proximate to enemy assets or as a shield around friendly assets. For example, a UAV or drone flying through said volume would be cut off from radio communications, severing command and control links and may suffer damage to its electronic systems.

Some systems may be configured specifically to create local denial of GPS or other navigation, localization, and timing systems; this effect may be used to disrupt or stop autonomous or semi-autonomous vehicles, such as self-driving cars.

Some systems may be used to project EMI around the perimeter of a ground vehicle to jam the radio controls (often mobile phones) commonly used to trigger improvised explosive devices (IEDs).

Some systems may modulate the EMI according to an algorithm such that personnel or equipment with certain cryptographic key material or equivalent are able to communicate through the EMI while denying communication to the enemy.

Kerr "Standing Wave" to Increase "Depth"

When a USPL is used to create air plasmas in conjunction with self-focusing, it is common for a series plasma "balls" or filaments to form along the beam path downrange of the target point. In many cases or for certain effects, this is undesirable because energy is wasted in the secondary plasma events. However, the controlled production of a series of plasma events from a single laser pulse could be leveraged to extend the area-of-coverage of a single pulse—reducing the number of pulses required to create dense coverage (in distance) within a voxel. This effect enhances the effect of and improves the performance of HRRT raster scans.

Accordingly, embodiments of the present invention use "standing waves" or repeating sequences of Kerr-effect-induced plasma filaments to extend the per-pulse area-of-effect of a USPL weapons system from a single point in space to a series of points in space, beginning at a controlled location, along the optical axis of the laser.

In some embodiments, the sequence of plasma filaments may also be used to produce one or more effects on their own. In some embodiments, subsequent laser pulses may interact with the sequences of plasma filaments to enhance their effects or produce other effects. In some embodiments, multiple coaxial pulses having different points of self-focusing are used to produce even denser sequences of plasma filaments along the same axis.

Targeting

The targeting system of a USPL weapon uses input from distance measuring equipment (DME) to measure distance-to-target, e.g., to configure the point of self-focusing. Laser-based DME is commonplace in many applications, including weapons systems; however, the laser(s) used for DME are typically dedicated to DME.

By contrast, embodiments of the present invention may use the USPL of the weapons system, in conjunction with other sensors, to measure distance-to-target or other distances; these measurements may then be used as inputs to the USPL weapons system's own targeting system(s) and/or to other systems requiring distance measurements. If the DME sensors are located close to the laser's exit optics, then the measurements will suffer minimally from and/or be less sensitive to parallax, calibration errors, or other sources of inaccuracy or loss of precision compared to separate, dedicated DME; this is of particular importance and value for some applications of USPL weapons where precise targeting («1 m) in azimuth, elevation, and range is required, such as NLWS or other safety-sensitive applications.

Scintillation Probing and Modeling

Scintillation (also referred to as turbulence in the literature) is the physical phenomenon that causes stars to "twinkle". Differences and changes in the refractive index of air along the path of a laser can cause the beam to wander over time or otherwise distort the beam. In continuous wave (CW) laser systems, scintillation can cause targeting errors, i.e., cause the beam's "point of impact" to diverge from its true point-of-aim in azimuth or elevation.

In addition to azimuth and elevation errors, scintillation can cause another class of problems for USPLs; more specifically, scintillation can change the distance at which pulses self-focus. For several USPL effects of interest, such as the production of pressure waves, the distance at which the effect is projected is no less important than the azimuth and elevation at which it is projected. Premature (up-range) self-focusing, in particular, may prevent the effect from occurring or may cause the effect to occur too close to friendly soldiers and equipment or too far from the enemy to be effective.

Significant prior work has been done with respect to the characterization of and compensation for the effects of scintillation for other optical systems; more specifically, mature solutions for measuring and compensating for scintillation are widely-used in terrestrial optical astronomy. In these cases, the distortion caused by scintillation is measured using a laser projected along the optical axis of the telescope; these measurements are used to calculate an inverse distortion function which is applied to telescope images to correct for scintillation/atmospheric distortion. In short, a laser is projected outward through the entire thickness of the atmosphere (~100 km), measurements are taken, and distortion to incoming light rays is corrected for.

Similarly, embodiments of the present invention can correct for scintillation affecting the outbound light rays (projecting downrange from the laser's exit optics) at some point downrange through a combination of modifying the "chirp" waveform and other optical corrections for each pulse using deformable mirrors, MEMS devices, liquid lenses, etc., if the distortion function is known.

Measuring the distortion function in this context is somewhat complicated in that the only measurements available affect inbound light. This can make distortion corrections calculations more difficult or less reliable. However, these complications are somewhat offset by the nature of laser light (i.e., having one or few component wavelengths selected a priori). Thus, the effects of scintillation on laser pulses can be measured by observing the resultant laser spot, plasma filament, etc. These observations/measurements can be fed back into the distortion compensation calculations for subsequent pulses—closed-loop feedback—compensating for scintillation such that azimuth, elevation, and distance of projected effects is controlled and predictable (or, stated alternatively, such scintillation-caused errors being minimized or eliminated).

Some embodiments include an additional scintillation compensation/cancellation component and one or more sensor components; where the sensors sense the downrange location of emitted pulses and/or effects; and where the sensor data is fed back into the scintillation compensation/cancellation component; and where said feedback is used to validate and/or refine scintillation compensation/correction. In some embodiments, sensor inputs may include human inputs or be human-generated and/or feedback may be affected, altered, or influenced by human input. In some embodiments, scintillation compensation/cancellation is effectuated by changing the weapon's point of aim or the scintillation compensation/cancellation and targeting/fire control components communicate and/or work in conjunction to effectuate scintillation compensation/correction.

Some embodiments include a single-wavelength laser and one or more wavelength conversion devices (i.e., the input is one wavelength, the output comprises a different wavelength). Some of the laser's energy is directed into the wavelength conversion devices, such that a single laser pulse produces output comprising a pulse of the laser's wavelength and a pulse of one or more of the converted wavelengths and the downrange effects are produced by a combination of pulses of the laser's wavelength and one or more of the converted wavelengths. The downrange scintillation is probed/measured at one or more of the system's wavelengths scintillation correction/compensation is effectuated for the output pulses' wavelengths individually and/or severally. In some embodiments the chirp is shaped/altered to produce optimal scintillation compensation/correction for two or more of the system's output wavelengths. In some embodiments, scintillation compensation/correction includes optical corrections/alterations (deformable mirrors, MEMS devices, liquid lenses, etc.) applied to each individual wavelength before they are recombined and pass through the exit optics.

Other embodiments include a component that detects conditions in which scintillation correction/compensation component(s) are inoperative, malfunctioning, or otherwise unable to ensure sufficient accuracy and/or precision to ensure compliance with safety parameters or other operational or procedural thresholds. In some of these embodiments, the system further comprises a component that alerts the user or operator of the system (human or automaton) when non-compliant conditions are detected. In some embodiments, the system further comprises a component that disables or prevents the firing of the weapon when non-compliant conditions are detected.

Equivalents

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

What is claimed is:

1. A system comprising:
   a laser source having an optical path and generating ultrashort laser pulses having a beam axis and capable of a high pulse repetition frequency;
   at least one high-speed beam steering device in the optical path of the laser source; and
   a controller configured to use the at least one steering device to move the beam axis within a range of at least five degrees to implement at least one desired effect in at least two noncontiguous locations.

2. The system of claim 1 wherein the at least one steering device is a mirror, prism, MEMS mirror device, or liquid lens.

3. The system of claim 2 wherein the at least one steering device is a mirror or prism, and the mirror or prism is moving or spinning.

4. The system of claim 1 wherein the controller is further configured to engage multiple targets within the system's field of view wherein inter-target engagement time/aiming is less than 10 ms.

5. The system of claim 4 wherein engagement with each target comprises a plurality of laser pulses raster-scanned in the vicinity of each target.

6. The system of claim 5 wherein the controller varies pulse repetition, per-pulse frequency content, beam divergence, peak pulse power, or wavelength to deliver varying effects to the engaged targets.

7. The system of claim 1 wherein the controller is further configured to raster-scan a set of 100×100×100 points with sub-meter spacing at least 15 times per second at a mean distance of at least 500 m.

8. The system of claim 1 mounted on a turret or a gantry.

9. The system of claim 1 wherein at least one or more of the per-pulse duration, peak pulse power, pulse frequency content, or beam divergence is used to control downrange distance along the beam axis at which a desired effect occurs.

10. A method comprising:
calculating, using a controller, pulse characteristics and distribution to achieve at least one desired effect;
generating, using a laser source capable of a high pulse repetition frequency, ultrashort laser pulses having a beam axis along an optical path based on the calculated pulse characteristics and distribution; and
moving, using at least one high-speed beam steering device in the optical path of the laser source, the beam axis within a range of at least five degrees to implement the at least one desired effect in at least two noncontiguous locations.

11. The method of claim 10 wherein the at least one steering device is a mirror, prism, MEMS mirror device, or liquid lens.

12. The method of claim 11 wherein the at least one steering device is a mirror or prism, and the mirror or prism is moving or spinning.

13. The method of claim 10 further comprising engaging multiple targets within a field of view wherein inter-target engagement time/aiming is less than 10 ms.

14. The method of claim 13 wherein engagement with each target comprises a plurality of laser pulses raster-scanned in the vicinity of each target.

15. The method of claim 14 further comprising varying pulse repetition, per-pulse frequency content, beam divergence, peak pulse power, or wavelength to deliver varying effects to the engaged targets.

16. The method of claim 11 further comprising raster scanning a set of 100×100×100 points with sub-meter spacing at least 15 times per second at a mean distance of at least 500 m.

17. The method of claim 11 wherein the laser source and at least one high-speed beam steering device are mounted on a turret or a gantry.

18. The method of claim 11 wherein at least one or more of the per-pulse duration, peak pulse power, pulse frequency content, or beam divergence is used to control downrange distance along the beam axis at which a desired effect occurs.

* * * * *